United States Patent [19]

Katz et al.

[11] Patent Number: 4,840,397
[45] Date of Patent: Jun. 20, 1989

[54] IMPACT PROTECTION DEVICE FOR THE OCCUPANTS OF MOTOR VEHICLES WITH A FILTER TO CLEAN THE DRIVING GAS

[75] Inventors: Egon Katz, Nagold; Alban Bossenmaier, Stuttgart; Luigi Barmbilla, Böblingen, all of Fed. Rep. of Germany

[73] Assignee: Daimler-Benz Aktiengesellschaft, Stuttgart, Fed. Rep. of Germany

[21] Appl. No.: 133,075

[22] Filed: Dec. 15, 1987

[30] Foreign Application Priority Data

Dec. 24, 1986 [DE] Fed. Rep. of Germany ....... 3644554

[51] Int. Cl.⁴ ............................................. B60R 21/08
[52] U.S. Cl. ..................................... 280/739; 280/743
[58] Field of Search ............... 280/728, 739, 738, 743, 280/742

[56] References Cited

U.S. PATENT DOCUMENTS

| | | | |
|---|---|---|---|
| 416,913 | 12/1889 | Hawkes | 239/50 |
| 3,481,625 | 12/1969 | Chute | 280/739 |
| 3,511,519 | 5/1970 | Martin | 280/739 |
| 3,778,083 | 12/1973 | Hamasaki | 280/739 |
| 3,892,425 | 7/1975 | Sakairi et al. | 280/743 |
| 4,097,065 | 6/1978 | Okada et al. | 280/739 |
| 4,111,458 | 9/1978 | Okada et al. | 280/739 |
| 4,500,114 | 2/1985 | Grey, Jr. | 280/738 |

FOREIGN PATENT DOCUMENTS

| | | |
|---|---|---|
| 2600426 | 7/1976 | Fed. Rep. of Germany . |
| 2125967 | 12/1977 | Fed. Rep. of Germany . |
| 1378390 | 12/1974 | United Kingdom . |
| 1403301 | 8/1975 | United Kingdom . |
| 1415330 | 11/1975 | United Kingdom . |

Primary Examiner—Charles A. Marmor
Assistant Examiner—Ross Weaver
Attorney, Agent, or Firm—Barnes & Thornburg

[57] ABSTRACT

A restraint device for the occupants of motor vehicles is described in which part of the wall of an airbag is designed as a filter. The filter has the keeps the particles released on ignition of the driving gas generator away from the internal space of the motor vehicle. The filter has a very high tear resistance so that the pores of the filter do not increase under load which would case the filter effect to decrease. A filter weave of aramid fibers in 2/1 twill weave with 24 threads per cm in the warp and 21 threads in the weft, the threads having a strength of dtex 250×2 Nm 40/2 is particularly advantageous.

6 Claims, 1 Drawing Sheet

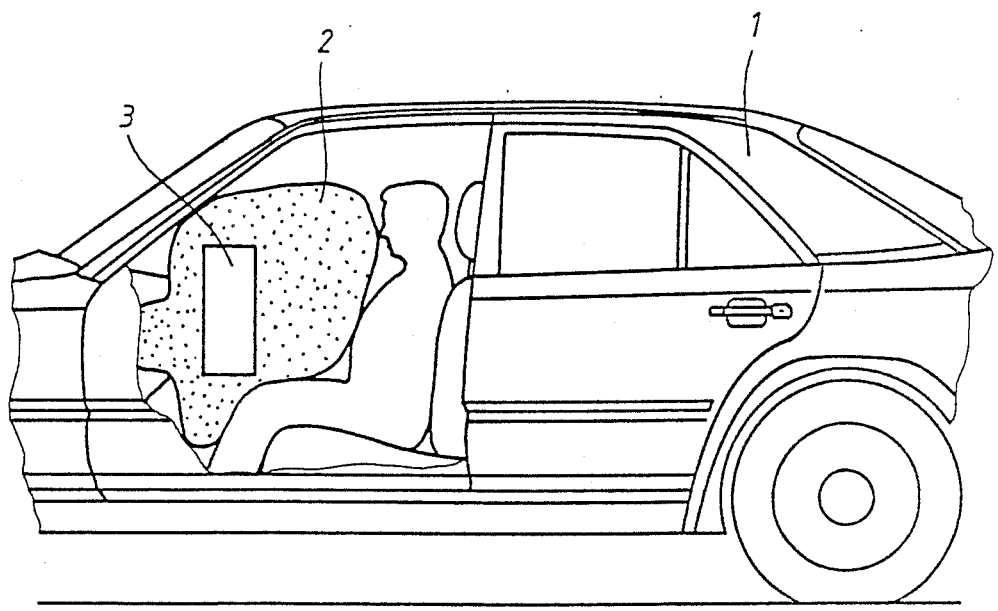

IMPACT PROTECTION DEVICE FOR THE OCCUPANTS OF MOTOR VEHICLES WITH A FILTER TO CLEAN THE DRIVING GAS

BACKGROUND AND SUMMARY OF THE INVENTION

The present invention relates to an impact protection device for the occupants of motor vehicles with a cushion (air bag) which can be blown up in the event of a collision or impact by a driving gas generated by combustion of solid gas-generating materials and having a filter for cleaning the driving gas.

In the event of an impact or a collision, a pyrotechnic gas generator is ignited in the usual airbag systems, the airbag being blown up in a few milliseconds and an effective protection of the occupant provided before impact on the bodywork of the vehicle.

In order to accept gently and without a spring-back tendency, the body of an occupant thrown forward with a large force, the airbag is provided with one or more blow-off devices through which the driving gas can flow away in a controlled manner during the impact of the occupant on the airbag.

It is known from U.S. Pat. No. 3,481,625 to provide the airbag with holes for this purpose or to manufacture it from porous material fabric. From U.S. Pat. No. 4,097,065, it is also known to insert a fabric piece provided with an expansion fold as a gas outlet in the wall of the airbag. In order to accept the gas pressure on impact, the fabric is slightly expandable in one direction and the expansion fold runs transverse to the direction in which the fabric is expandable so that the fabric can curve outwards in the shape of a spherical shell when it is loaded.

Since finely divided particles can occur on ignition of the gas generator and these can have an irritant effect on the air passages of the occupants of the vehicle, it is shown in German Pat. No. 2,125,967 to connect the outlet opening of the airbag with a duct which emerges outside the vehicle body. Because such a solution is extraordinarily expensive, it has been suggested in German Published Unexamined Patent Application No. 2,600,426 to pass the resulting gases through a filter pack located directly at the gas generator. Since this filter pack can only have a relatively small area because of the limited installation space available and, in addition, since there must only be a small resistance to the gas if the time required to blow up the airbag is not to be adversely affected, only relatively large particles can be retained by this filter. The gas which flows through the blow-off openings of the airbag into the internal space therefore still contains irritant particles, even if to a reduced extent.

An objective of the present invention is to find a filter which is easy to manufacture and which filters the driving gas such that the occurrence of irritant particles in the internal space of the vehicle is reduced to a negligible level.

This and other objectives are achieved in an impact protection device for an occupant of a motor vehicle, having a cushion which can be blown up in the event of a collision by a driving gas generated by combustion of solid gas-generating materials, by providing a part of a wall of the cushion with a multiplicity of openings which are outlet flow openings from said cushion for the driving gas. A filter cleans the solid combustion residues from the driving gas, the outlet openings simultaneously forming the filter. The filter comprises a fabric having a filter weave with a tearing force to DIN 53 354 of at least 1,500 n/5 centimeters, a further tearing force to DIN 53 536 with test body D of at least 150 N, a heat resistance of at least 1 second at 300 C without substantial reduction in strength, a pore size by means of which at least 50% of particles with a size of more than 0.1 μm are retained and an air permeability L in $L.cm^{-2}.min^{-1}$, which lies in the region enclosed by curves $L=0.05+0.075.p$ and $L=1.2-0.6.p$, and which has an area of 500 to 10,000 $cm^2$.

The filter forms a part of the wall of the airbag and is simultaneously the outlet openings for the driving gas. So that its function can be correctly fulfilled, the filter comprises a filter fabric with a tearing force to DIN 53 354 of at least 1500N/5 cm, a further tearing force to DIN 53 356 with the test body B of at least 150N, a thermal resistance with which it can withstand a temperature of 300° C. for at least 1 second without substantial reduction in strength and a pore size by means of which at least 80% of the particles with a size greater than 0.1 μm can be retained. Since the filter is, simultaneously, the outlet opening for the driving gas from the airbag, it must have an air permeability L, measured in liters per $cm^2$, which lies in the region enclosed by the curves $L=0.05+0.075.p$ and $L=1.2+0.6p$. The filter area should have a size between 500 and 10,000 $cm^2$.

Fabrics which have a tearing force of at least 2000 N/5 cm and a further tearing force of at least 200 N are preferred. The usual types of weave can be considered as the weave for the fabric, for example linen weave, twill weave, etc., but a fabric with 2/1 twill weave is preferred because the best results are achieved with this. Aramid from staple fibre, which best satisfies the strength requirements, is preferred as the material for the threads of which the fiber fabric consists. In this connection, the filter fabric should not expand under load so that the preselected pore sizes are retained and particles do not, for example, pass through the filter under load in an undesirable manner due to an increase in the size of the pores. A further advantage of the aramid fabric is its good resistance to temperature because both the gases escaping from the gas generator and the particles have an increased temperature. The strength of the aramid fabric is not adversely affected by these temperatures.

It is preferred that the filter fabric should consist of 24 threads per cm in the warp and 21 threads in the weft; the threads should have a strength of dtex 250×2 Nm 40/2. The filter area should preferably be about 650 to 2000 $cm^2$. For filters with a relatively low air permeability, larger filter surfaces will be selected and, smaller filter surfaces for filters with a better air permeability.

Other objects, features and advantages of the present invention will become more apparent from the following description when taken with the accompanying drawings which show, for purposes of illustration only, an embodiment in accordance with the present invention.

BRIEF DESCRIPTION OF THE DRAWINGS

The single FIGURE is a partial side view of a device constructed in accordance with a preferred embodiment of the present invention.

DETAILED DESCRIPTION OF THE DRAWINGS

A partial view of a device designed according to the invention is shown in the illustration, the airbag being shown in its expanded condition. The drawing shows the partial view of a vehicle with a body 1 and an airbag 2, blown up in front of the occupant. A part of the airbag 2 is taken up by the filter 3. In contemplated embodiments, this filter is symmetrically constructed, such that a further filter is present on the side of the airbag which is not visible and is opposite to the filter 3. The filter 3 in some preferred embodiments is sewn into a corresponding opening of the airbag 2 but in other preferred embodiments, the complete airbag is manufactured from the filter material, and those parts of the airbag whose surfaces do not have to possess filtering properties, are made impermeable to gas by coating them with an organic substance.

A number of advantages are associated with the invention. It is no longer necessary to filter the whole of the driving gas, as in the present state of the art, but only that part which flows out of the airbag. It is this fact which makes possible the use of fine filters because the gas quantity flowing out of the airbag is substantially smaller than the gas quantity necessary for blowing up the airbag and because, furthermore, more time is available for the gas to flow out. In addition, the surface of an unfolded airbag is very large so that even large filter areas can be used. By this means, it is possible to filter the gases to such an extent that practically no particles reach the internal space of the vehicle.

The advantages of staple fiber, compared with endless fiber which is also contemplated in the yarn material lie in the fact that the fiber, and hence the yarn, is rougher. Because of this, the threads hold their relative position better in the fabric composite even under load and the pore density is also more even when staple fibers are used in time when under load and locally (for example at folds or seams). In addition, it is easier to produce fine pored filter if a rough thread is used.

Although the present invention has been described and illustrated in detail, it is to be clearly understood that the same is by way of illustration and example only and is not to be taken by way of limitation. The spirit and scope of the invention are to be limited only by the terms of the appended claims.

What we claim is:

1. An impact protection device for an occupant of a motor vehicle, having a cushion which can be blown up in the event of a collision by means of a driving gas generated by combustion of solid gas-generating materials, a part of a wall of said cushion having a multiplicity of openings which are outlet flow openings from said cushion for said driving gas, and having a filter for cleaning solid combustion residues from said driving gas, wherein:

said outlet openings simultaneously form said filter and said filter comprises a fabric that does not stretch upon being blown up by the driving gas and which has a filter weave with a tearing force to DIN 53 354 of at least 1500N/5 cm, a further tearing force to DIN 53 536 with test body B of at least 150N, a heat resistance of at least 1 second at 300° C. without substantial reduction in strength, an unstressed pore size by means of which at least 50% of particles with a size of more than 0.1 $\mu$m are retained and an air permeability L in $L.cm^{-2}.min^{-1}$, which lies in the region enclosed by curves $L=0.05+0.075.p$ and $L=1.2+0.6.p$, and which has an area of 500 to 10,000 $cm^2$.

2. Restraint device according to claim 1, wherein said filter has a filter area between 650 and 1000 $cm^2$.

3. Restraint device according to claim 2, wherein said filter fabric has a 2/1 twill weave.

4. Restraint device according to claim 3, wherein said filter fabric comprises aramid yarn.

5. Restraint device according to claim 4, wherein said filter fabric is made up of 24 threads per cm in the warp and 21 threads per cm in the weft, said threads having a strength of dtex 250×2 Nm 40/2.

6. Restraint device according to claim 4, wherein said yarn is spun from staple fiber.

* * * * *